(12) United States Patent
Hancock (10) Patent No.: US 9,939,181 B2
(45) Date of Patent: Apr. 10, 2018

(54) MICRO-COMBINED HEAT AND POWER HEAT PUMP DEFROST PROCEDURE

(71) Applicant: Trane International Inc., Piscataway, NJ (US)

(72) Inventor: Stephen Stewart Hancock, Flint, TX (US)

(73) Assignee: Trane International Inc., Piscataway, NJ (US)

( * ) Notice: Subject to any disclaimer, the term of this patent is extended or adjusted under 35 U.S.C. 154(b) by 165 days.

(21) Appl. No.: 14/555,248

(22) Filed: Nov. 26, 2014

(65) Prior Publication Data

US 2015/0159929 A1  Jun. 11, 2015

Related U.S. Application Data

(60) Provisional application No. 61/914,868, filed on Dec. 11, 2013.

(51) Int. Cl.

| F25B 7/00 | (2006.01) |
|---|---|
| F25B 27/02 | (2006.01) |
| F25B 13/00 | (2006.01) |
| F25B 47/02 | (2006.01) |
| F25B 49/02 | (2006.01) |
| F25D 21/12 | (2006.01) |

(52) U.S. Cl.
CPC ............. *F25B 27/02* (2013.01); *F25B 13/00* (2013.01); *F25B 47/022* (2013.01); *F25B 49/02* (2013.01); *F25B 2313/02542* (2013.01); *F25B 2313/02543* (2013.01); *F25B 2341/0662* (2013.01); *F25B 2600/0253* (2013.01); *F25B 2600/0261* (2013.01); *F25B 2600/2513* (2013.01); *F25D 21/125* (2013.01); *Y02B 30/741* (2013.01)

(58) Field of Classification Search
CPC ........ F25B 27/02; F25B 13/00; F25B 47/022; F25B 2313/02542; F25B 2313/02543; F25B 2600/112; F25D 21/125
See application file for complete search history.

(56) References Cited

U.S. PATENT DOCUMENTS

| 2,975,611 | A | 3/1961 | Pietsch |
|---|---|---|---|
| 3,010,288 | A | 11/1961 | Jacobs |
| 3,068,661 | A | 12/1962 | McGrath |
| 6,021,644 | A | 2/2000 | Ares et al. |
| 6,141,978 | A | 11/2000 | Schuster |
| 6,467,284 | B1 | 10/2002 | Chen et al. |

(Continued)

*Primary Examiner* — Elizabeth Martin
(74) *Attorney, Agent, or Firm* — Conley Rose, P.C.; J. Robert Brown, Jr.

(57) ABSTRACT

Systems and methods are disclosed that may include recovering heat from a generator to defrost the heat exchanger by passing a heat transfer fluid from the generator through a recovery heat exchanger that is configured to promote heat transfer between the heat transfer fluid and a refrigerant flowing therethrough, reducing a restriction of the refrigerant, reducing an airflow through the heat exchanger, and delivering the heated refrigerant to the heat exchanger. Systems and methods may also include recovering heat from an exhaust of the generator to deter the formation of frozen condensate on the outdoor heat exchanger by diverting at least a portion of a hot exhaust fluid discharged by the generator onto the outdoor heat exchanger.

19 Claims, 4 Drawing Sheets

(56) References Cited

U.S. PATENT DOCUMENTS

| | | | |
|---|---|---|---|
| 2005/0257557 A1* | 11/2005 | Chin | F25B 13/00 62/324.1 |
| 2006/0242982 A1* | 11/2006 | Swofford | F25B 47/02 62/248 |
| 2013/0091882 A1* | 4/2013 | Cho | F25B 13/00 62/156 |
| 2013/0312436 A1* | 11/2013 | Chen | F25B 47/025 62/81 |
| 2014/0033743 A1* | 2/2014 | Hancock | F25B 13/00 62/79 |
| 2014/0090406 A1* | 4/2014 | Ishikawa | F25B 47/02 62/82 |

\* cited by examiner

MICRO-COMBINED HEAT AND POWER HEAT PUMP DEFROST PROCEDURE

CROSS-REFERENCE TO RELATED APPLICATIONS

The present application claims priority under 35 U.S.C. § 119(e) to U.S. Provisional Patent Application No. 61/914,868 filed on Dec. 11, 2013 by Hancock, entitled "Micro-Combined Heat and Power Heat Pump Defrost Procedure," the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Heating, ventilation, and/or air conditioning (HVAC) systems may generally be used in residential and/or commercial areas for heating and/or cooling to create comfortable temperatures inside those areas. Some HVAC systems may be heat pump systems. Heat pump systems may generally be capable of cooling a comfort zone by operating in a cooling mode for transferring heat from a comfort zone to an ambient zone using a refrigeration cycle and also generally capable of reversing the direction of refrigerant flow through the components of the HVAC system so that heat is transferred from the ambient zone to the comfort zone, thereby heating the comfort zone. When a heat pump system is operated in cold ambient temperatures, condensation may often form on an outdoor condenser coil and freeze. Accordingly, it may be necessary to periodically defrost the outdoor condenser coil. Current methods used to defrost the outdoor condenser coil typically involve reversing the operation of the heat pump system to operate in a cooling mode so that heated refrigerant is delivered to the condenser coil to defrost it. Reversing the operation of the heat pump system may cause damage, stress, and excessive wear on the components of the heat pump system, may reduce the efficiency of the heat pump system, and may require the use of backup heat sources to provide heat to an indoor climate-controlled area.

SUMMARY

In some embodiments of the disclosure, a heat pump heating, ventilation, and/or air conditioning (HVAC) system is disclosed as comprising a generator comprising an internal combustion engine, the generator configured to produce heat as a function of operating the internal combustion engine, a heat exchanger configured to receive a refrigerant therethrough in a first flow direction associated with operation of the heat pump in a heating mode, and a controller configured to both (1) initiate a reduction of restriction provided by a refrigerant restriction device and (2) initiate transferring an increased amount of heat produced as a function of operating the internal combustion engine to the heat exchanger while continuing to flow refrigerant through the heat exchanger in the first flow direction.

In other embodiments of the disclosure, a method of operating a heat pump heating, ventilation, and/or air conditioning (HVAC) system is disclosed as comprising: providing a generator comprising an internal combustion engine; producing heat as a function of operating the internal combustion engine; flowing refrigerant in a first flow direction associated with operating the heat pump HVAC system in a heating mode through a heat exchanger; and continuing to flow refrigerant in the first flow direction through the heat exchanger while both (1) reducing a refrigerant flow restriction and (2) transferring an increased amount of heat produced as a function of operating the internal combustion engine to the heat exchanger.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

In some cases, it may be desirable to provide an outdoor heat exchanger defrosting system and method in an HVAC system, such as, but not limited to a heat pump system. For example, in HVAC systems where condensation may form and freeze on an outdoor heat exchanger that may degrade operation and/or efficiency of the HVAC system, it may be desirable to quickly and efficiently eliminate frozen condensate and/or frost on the outdoor heat exchanger. In some embodiments, systems and methods are disclosed that comprise recovering heat expelled from an electrical power generation device or other source of waste heat and directing the recovered heat to the outdoor heat exchanger. In some embodiments, the outdoor heat exchanger defrosting system and/or method may be used in a combined heat and power heat pump (CHPHP) system.

Figure 1:
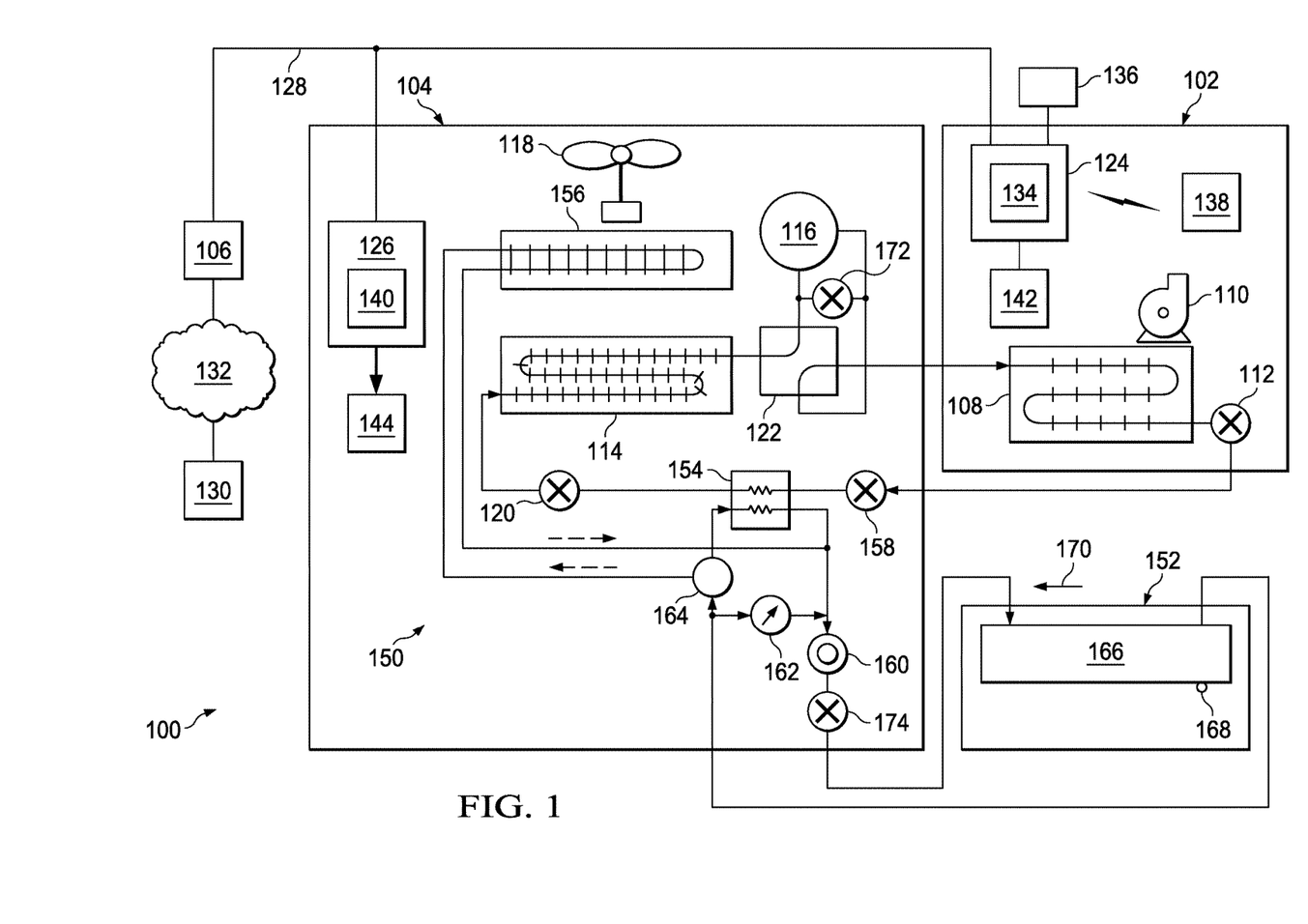
FIG. 1 is a schematic diagram of an HVAC system according to an embodiment of the disclosure.

Referring now to FIG. 1, a schematic diagram of an HVAC system 100 is shown according to an embodiment of the disclosure. HVAC system 100 generally comprises an indoor unit 102, an outdoor unit 104, and a system controller 106. In some embodiments, the HVAC system 100 may also comprise a generator 152 and a generator fluid circuit 150 that is contained within the outdoor unit 104. The system controller 106 may generally control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality. In the embodiment shown in FIG. 1, the outdoor unit 104 may also comprise a recovery heat exchanger 154 and a discharge heat exchanger 156. Furthermore, the HVAC system 100 may also comprise a generator 152 and a generator fluid circuit 150 that is configured to connect the generator 152 to the recovery heat exchanger 154 and the discharge heat exchanger 156.

Indoor unit 102 generally comprises an indoor heat exchanger 108, an indoor fan 110, and an indoor metering device 112. Indoor heat exchanger 108 is a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 is a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 is configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 is an electronically controlled motor driven electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of the refrigerant through the indoor metering device 112.

Outdoor unit 104 generally comprises an outdoor heat exchanger 114, a compressor 116, an outdoor fan 118, an outdoor metering device 120, and a reversing valve 122. Outdoor heat exchanger 114 is a spine fin heat exchanger configured to allow heat exchange between refrigerant carried within internal passages of the outdoor heat exchanger 114 and fluids that contact the outdoor heat exchanger 114 but that are kept segregated from the refrigerant. In other embodiments, outdoor heat exchanger 114 may comprise a plate fin heat exchanger, a microchannel heat exchanger, or any other suitable type of heat exchanger. It will be appreciated that the outdoor heat exchanger 114 may also be referred to as a condenser coil.

The compressor 116 is a multiple speed scroll type compressor configured to selectively pump refrigerant at a plurality of mass flow rates. In alternative embodiments, the compressor 116 may comprise a modulating compressor capable of operation over one or more speed ranges, a reciprocating type compressor, a single speed compressor, and/or any other suitable refrigerant compressor and/or refrigerant pump. In some embodiments, the compressor may comprise a compressor unloading valve 172, which may be an actuated valve, a solenoid-controlled valve, and/or a damper which may be connected in parallel to the compressor 116 and configured to control the pressure across the compressor 116. In some embodiments, the compressor unloading valve 172 may be configured in the refrigerant circuit substantially parallel to the compressor 116 such that when the compressor unloading valve 172 is open, refrigerant may travel directly from a compressor discharge side to a compressor intake side.

The outdoor fan 118 is an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 is configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 is a thermostatic expansion valve. In alternative embodiments, the outdoor metering device 120 may comprise an electronically controlled motor driven EEV similar to indoor metering device 112, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

The reversing valve 122 is a so-called four-way reversing valve. The reversing valve 122 may be selectively controlled to alter a flow path of refrigerant in the HVAC system 100 as described in greater detail below. The reversing valve 122 may comprise an electrical solenoid or other device configured to selectively move a component of the reversing valve 122 between operational positions.

In some embodiments, the outdoor unit 104 may also comprise an additional metering device 158 coupled to the recovery heat exchanger 154 and configured to regulate the flow of refrigerant therethrough. The metering device 158 may comprise a fixed orifice component, for example a capillary tube assembly. In alternative embodiments, the metering device 158 may comprise a thermostatic expansion valve, an electronically controlled motor driven EEV, and/or any other suitable metering device. The metering device 158 may also comprise and/or be associated with a refrigerant check valve and/or refrigerant bypass for use when the direction of refrigerant flow through the metering device 158 is such that the metering device 158 is not intended to meter or otherwise substantially restrict flow of the refrigerant through the outdoor metering device 120. In other embodiments, however, the outdoor unit 104 may not include a metering device 158.

Still referring to FIG. 1, the system controller 106 may generally comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, the system controller 106 may not comprise a display and may derive all information from inputs from remote sensors and remote configuration tools. In some embodiments, the system controller 106 may comprise a temperature sensor and may further be configured to control heating and/or cooling of zones associated with the HVAC system 100. In some embodiments, the system controller 106 may be configured as a thermostat for controlling supply of conditioned air to zones associated with the HVAC system 100.

In some embodiments, the system controller 106 may also selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or any other device 130 via a communication network 132. In some embodiments, the communication network 132 may comprise a telephone network, and the other device 130 may comprise a telephone. In some embodiments, the communication network 132 may comprise the Internet, and the other device 130 may comprise a smartphone and/or other Internet-enabled mobile telecommunication device. In other embodiments, the communication network 132 may also comprise a remote server.

The indoor controller 124 may be carried by the indoor unit 102 and may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134 that may comprise information related to the identification and/or operation of the indoor unit 102. In some embodiments, the indoor controller 124 may be configured to receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120. In some embodiments, the indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may also be configured to communicate with the outdoor metering device 120 and/or otherwise affect control over the outdoor metering device 120.

The outdoor controller 126 may be carried by the outdoor unit 104 and may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor.

The HVAC system 100 is shown configured for operating in a so-called heating mode in which heat is absorbed by a refrigerant at the outdoor heat exchanger 114 and heat is rejected by refrigerant at the indoor heat exchanger 108. In some embodiments, the compressor 116 may be operated to compress refrigerant and pump the relatively high temperature and high pressure compressed refrigerant from the compressor 116 to the indoor heat exchanger 108 through the reversing valve 122. From the indoor heat exchanger 108, the refrigerant may be pumped unaffected through the indoor metering device 112 to the outdoor metering device 120 and ultimately to the outdoor heat exchanger 114. The refrigerant may experience a pressure differential across the outdoor metering device 120, be passed through the outdoor heat exchanger 114, and ultimately reenter the compressor 116. As the refrigerant is passed through the outdoor heat exchanger 114, the outdoor fan 118 may be operated to move air into contact with the outdoor heat exchanger 114, thereby transferring heat from the air surrounding the outdoor heat exchanger 114 to the refrigerant. The refrigerant may thereafter re-enter the compressor 116 after passing through a second internal passage within the reversing valve 122.

Alternatively, to operate the HVAC system 100 in a so-called cooling mode, most generally, the roles of the indoor heat exchanger 108 and the outdoor heat exchanger 114 are reversed as compared to their operation in the above-described heating mode. For example, the reversing valve 122 may be controlled to alter the flow path of the refrigerant, the indoor metering device 112 may be enabled, and the outdoor metering device 120 may be disabled and/or bypassed. In cooling mode, heat is absorbed by refrigerant at the indoor heat exchanger 108 and heat is rejected by the refrigerant at the outdoor heat exchanger 114. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108.

Still referring to FIG. 1, the HVAC system 100 also comprises a generator 152 and a generator fluid circuit 150. Generator 152 may comprise a generator heat exchanger 166. The generator 152 may generally be configured to produce and supply electricity and/or rejected heat to provide at least a portion of the energy consumption and/or heat delivery to the indoor unit 102, the outdoor unit 104, and/or any other component of the HVAC system 100. The generator 152 may also comprise an exhaust 170, from which rejected heat is carried by hot exhaust fluid that is expelled from the generator 152 as a result of combustion within the generator 152. In some embodiments, the generator 152 may comprise an electricity generating device comprising and/or powered by an internal combustion engine configured to receive and consume a fuel such as natural gas, propane, gasoline, and/or diesel. In other embodiments, the generator 152 may comprise another electricity generating device including, but not limited to, a fuel cell, a generator powered by a micro-turbine, a thermal-photovoltaic system, and/or any other suitable device capable of supplying electrical power and/or heat. It will be appreciated that a variety of combinations of various fuels and oxidants may also be used. Additional examples of fuels include hydrogen, hydrocarbons, alcohols, and biomass. Examples of oxidants include air, oxygen, chlorine, and chlorine dioxide. A thermal-photovoltaic system may convert solar energy into electricity and/or heat and provide a portion of the power produced to HVAC system 100 without a supply of fuel or oxidizer.

The generator fluid circuit 150 may generally be configured to selectively connect the generator heat exchanger 166 of the generator 152 in fluid communication with the recovery heat exchanger 154 and the discharge heat exchanger 156, both of which are accommodated by and housed within the outdoor unit 104, so that an acceptable heat transfer fluid may selectively flow between the generator heat exchanger 166 and at least one of the recovery heat exchanger 154 and the discharge heat exchanger 156. Heat energy discharged by the generator 152 may therefore generally be carried by the generator fluid circuit 150 from the generator heat exchanger 166 to the recovery heat exchanger 154 and/or the discharge heat exchanger 156. An acceptable heat transfer fluid may comprise water, water and ethylene glycol mixture, brine solution, refrigerant, oil, or any other suitable heat transfer fluid. In some embodiments, the heat transfer fluid may transfer heat, such as rejected heat from the generator 152, to the refrigerant of HVAC system 100 through the recovery heat exchanger 154 and/or the discharge heat exchanger 156.

The generator fluid circuit 150 also comprises a coolant pump 160, a mixing valve 162, and a diverter valve 164, also accommodated by and housed within the outdoor unit 104, and selectively connected in fluid communication through a plurality of fluid conduits. Such fluid conduits may include pipes, tubes, and/or any other suitable conduit which may comprise one or more of a variety of rigid or flexible materials, e.g., polyvinyl chloride (PVC), ductile iron, steel, cast iron, polypropylene, polyethylene, copper, hose with a braided sheath, and/or any other suitable material. The coolant pump 160 may generally be configured to pump the generator heat transfer fluid into inlet tubing associated with the generator heat exchanger 166, through the generator heat exchanger 166, out of the generator heat exchanger 166, through outlet tubing associated with the generator heat exchanger 166, and subsequently to recovery heat exchanger 154 and/or discharge heat exchanger 156 prior to returning the heat transfer fluid to the generator heat exchanger 166.

The mixing valve 162 and/or the diverter valve 164 of the generator fluid circuit 150 may be configured to open and close in response to a heating or cooling mode selection by a controller 106, 124, 126 and/or a difference between a measured heat transfer fluid temperature and a heat transfer fluid temperature set-point. For example, when HVAC system 100 is in the so-called heating mode, diverter valve 164 may direct at least a portion of the heat transfer fluid to recovery heat exchanger 154. In some embodiments, the recovery heat exchanger 154 may be configured to promote heat transfer between the heat transfer fluid and the refrigerant flowing through the recovery heat exchanger 154. Alternatively, the diverter valve 164 may direct heat transfer fluid along a different flow path, such as to discharge heat exchanger 156, during operation of HVAC system 100 in a cooling mode. In some embodiments, the discharge heat exchanger 156 may be configured to promote heat transfer between the heat transfer fluid flowing through the discharge heat exchanger 156 and an airflow pulled through the discharge heat exchanger 156 by outdoor fan 118.

In some embodiments, the generator 152 may also comprise a generator temperature sensor 168 configured to measure the heat transfer fluid temperature within the generator fluid circuit 150 and/or the generator heat exchanger 166, a conduit temperature, and/or an internal temperature of the generator 152. In some embodiments, the generator fluid circuit 150 may comprise one or more thermostats, such as generator circuit thermostat 174, and/or temperature sensors to measure a plurality of temperatures associated with the circulated heat transfer fluid. In some embodiments, if a temperature of the heat transfer fluid associated with the generator heat exchanger 166 drops below a selected temperature set-point, the mixing valve 162 may direct a portion of the heat transfer fluid that has received rejected heat from the generator 152 to circulate within the generator fluid circuit 150 and return to the generator heat exchanger 166 without passing through either the recovery heat exchanger 154 or the discharge heat exchanger 156. Alternatively, in some embodiments, the temperature of the heat transfer fluid returning to the generator 152 may be controlled by the generator circuit thermostat 174 that may generally be configured to remain closed until a predetermined return temperature is achieved, at which time the generator circuit thermostat 174 may modulate the flow of the heat transfer fluid to the generator 152 to control that temperature. Thus, at least a portion of the rejected heat from the generator 152 may be directed back to the generator heat exchanger 166, i.e. to the generator 152, where the returning heat may help maintain a generator 152 operating temperature and/or may receive additional heat to reach a threshold temperature for triggering transfer of the heat to at least one of the recovery heat exchanger 154 and the discharge heat exchanger 156.

The rejected heat from the generator 152 may also be utilized for an HVAC system 100 functionality to increase the efficiency of the HVAC system 100. For example, when the HVAC system 100 is operating in the heating mode, the rejected heat may be directed first to the outdoor unit 104 and then transferred to the indoor unit 102 for heating a space to which the indoor unit 102 supplies air. This benefit may be achieved through the transfer of heat, i.e. heat energy, from the heat transfer fluid in the generator fluid circuit 150 to the refrigerant via the recovery heat exchanger 154. Transferring the rejected heat to the refrigerant may therefore augment the transfer of heat occurring within outdoor heat exchanger 114. The transfer of rejected heat from the generator heat exchanger 166 to the refrigerant may generally be referred to as heat recovery.

Still referring to FIG. 1, in some embodiments, the rejected heat from the generator 152 may also be used to defrost the outdoor heat exchanger 114. As previously stated, the generator 152 may be configured to discharge heat that may result from the combustion of fuel within the generator 152. In some embodiments, heat may be carried by the generator heat transfer fluid and selectively expelled from the generator 152 by the generator heat exchanger 166 through the generator fluid circuit 150 to the recovery heat exchanger 154 and/or the discharge heat exchanger 156. When the HVAC system 100 is configured in the heating mode, the diverter valve 164 of the generator fluid circuit 150 may generally be configured such that the generator heat transfer fluid from the generator heat exchanger 166 is at least partially directed to the recovery heat exchanger 154. The recovery heat exchanger 154 may generally be configured to promote heat transfer between the generator heat transfer fluid received from the generator heat exchanger 166 and refrigerant received from the indoor unit 102 that is flowing through the recovery heat exchanger 154. Within the recovery heat exchanger 154, the refrigerant may thus absorb some of the heat from the generator heat transfer fluid. The heated refrigerant may then pass through the outdoor metering device 120 before entering the outdoor heat exchanger 114. In some embodiments, the outdoor metering device 120 may be configured in a fully open position during a defrost mode operation. In other embodiments, the outdoor metering device 120 may comprise a refrigerant bypass, such that flow of the refrigerant through the outdoor metering device 120 may be substantially unrestricted when employed in a defrost mode. In some embodiments, maintaining an unrestricted flow of heated refrigerant through the outdoor metering device 120 may maintain the subcooling in the refrigerant. In some embodiments, metering device 158 may also be configured to provide substantially no restriction to the flow of refrigerant therethrough. In some embodiments, the heated refrigerant may supply sufficient heat to the outdoor heat exchanger 114 such that the heat may melt any frozen condensate and/or frost accumulated on the outdoor heat exchanger 114. Accordingly, when the HVAC system 100 is operated to recover heat from the recovery heat exchanger 154 received through the generator fluid circuit 150 to defrost the outdoor heat exchanger 114, this may be referred to as a defrost mode of operation of the HVAC system 100.

In some embodiments, when the HVAC system 100 is operated in the defrost mode, the speed of the outdoor fan 118 may be reduced and/or the outdoor fan 118 may be completely deenergized. Reducing the speed of the outdoor fan 118 may generally reduce the amount of airflow that is passed through the outdoor heat exchanger 114, which may reduce the amount of heat transferred from the outdoor heat exchanger 114 into an airflow being passed through the outdoor heat exchanger 114. In some embodiments, reducing the speed of the outdoor fan 118 may increase a rate of heat buildup in the refrigerant flowing through the outdoor heat exchanger 114 that may result in quicker defrosting of the outdoor heat exchanger 114. In some embodiments, reducing speed of the outdoor fan 118 may increase a rate at which heat is absorbed by the frozen condensation, which, in turn, may decrease the amount of time required to defrost the outdoor heat exchanger 114. While heat may continue to be provided to an indoor climate-controlled area while the HVAC system 100 is operated in the defrost mode, heat delivery to the indoor area may be reduced during defrosting of the outdoor heat exchanger 114. Accordingly, it will be appreciated that in some embodiments, the indoor fan 110 may be operated at a reduced airflow rate while the HVAC system 100 is operated in the defrost mode.

The defrost mode may generally be configured to be controlled in response to the configuration and/or demands of the HVAC system 100. In some embodiments, the HVAC system 100 may be configured in a defrost mode in response to a user input via a controller 106, 124, 126. In some embodiments, however, the defrost mode may be employed based on a preprogrammed schedule in a controller 106, 124, 126. For example, the defrost mode may be employed every 3 hours. In some embodiments, the defrost mode may be configured to be controlled in response to a measured refrigerant temperature and/or a difference between a measured refrigerant temperature and a refrigerant temperature set threshold. In some embodiments, the defrost mode may be controlled in response to a measured refrigerant temperature entering the outdoor heat exchanger 114 and/or entering the indoor heat exchanger 108. In yet other embodiments, the defrost mode may be controlled in response to an outdoor ambient temperature or other physical phenomenon indicating excessive frost on the outdoor heat exchanger 114.

Operating the HVAC system 100 in a defrost mode to recover heat through the generator fluid circuit 150 that may generally be expelled by the generator 152 may generally eliminate the need to reverse the refrigerant flow direction to defrost the outdoor heat exchanger 114. As stated, reversing the refrigerant flow direction to defrost the outdoor heat exchanger 114 may cause damage, stress, and excessive wear on the components of the heat pump system. Thus, recovering heat from the generator 152 through a generator fluid circuit 150 to defrost the outdoor heat exchanger 114 may extend the life and/or reliability of HVAC system 100 components. Additionally, recovering heat from the generator 152 may also reduce and/or eliminate the need to operate backup heat sources, such as electrical resistance heaters, to provide heat to an indoor climate-controlled area, since the indoor heat exchanger 108 may continue provide heat to an indoor climate-controlled area while operating in the defrost mode, as opposed to the indoor heat exchanger 108 providing cooling. Thus, the outdoor heat exchanger 114 may generally be defrosted while continuously providing heat to an indoor climate-controlled area.

Figure 2:
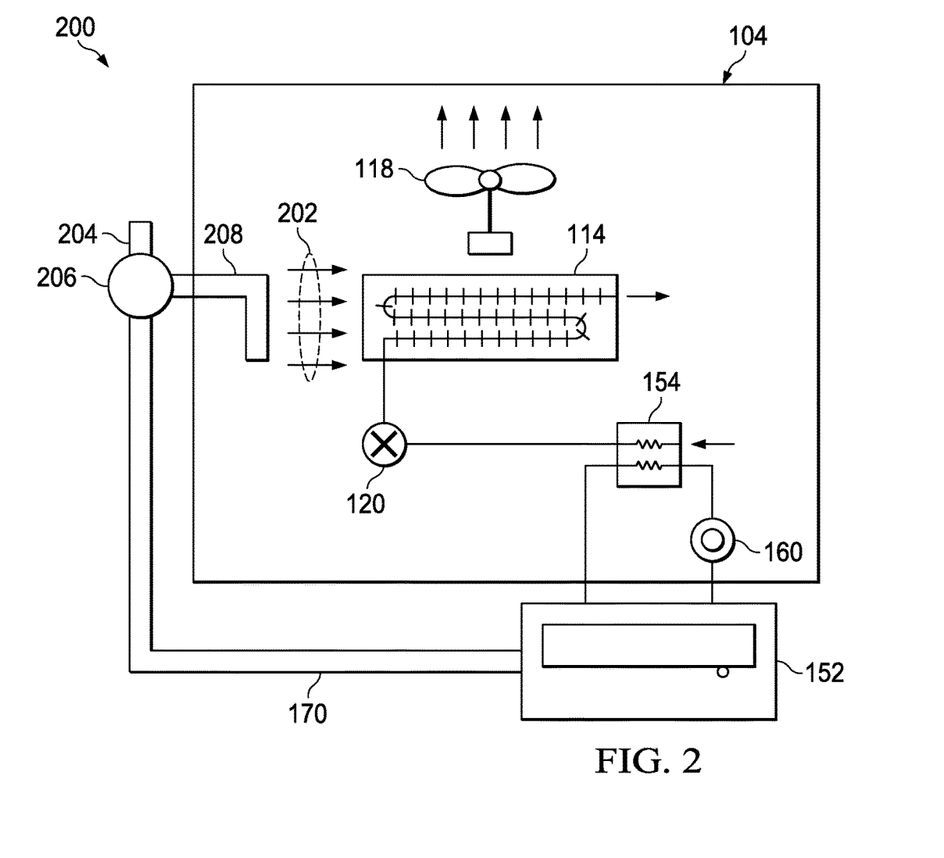
FIG. 2 is a schematic drawing of an exhaust heat recovery system according to an embodiment of the disclosure.

Referring now to FIG. 2, a schematic drawing of an exhaust heat recovery system 200 is shown according to an embodiment of the disclosure. The exhaust heat recovery system 200 may generally be a component of the HVAC system 100. The exhaust heat recovery system 200 may generally be configured in a heat recovery mode to recover the heat produced by the combustion of fuel within the generator 152 that may otherwise be lost through discharging hot exhaust fluid into the surrounding environment. Accordingly, heat recovered from the exhaust 170 of the generator 152 may, in some embodiments, be used to deter and/or delay the formation of frozen condensation on the outdoor heat exchanger 114. In some embodiments, however, heat recovered from the exhaust 170 may also comprise enough heat to defrost the outdoor heat exchanger 114. The exhaust heat recovery system 200 may comprise an exhaust vent tube 204, a diverter valve 206, and an exhaust delivery tube 208. The diverter valve 206 may generally be connected in fluid communication to the exhaust 170 of the generator 152 and configured to receive hot exhaust fluid that may be discharged through the exhaust 170. Depending on the configuration of the exhaust heat recovery system 200 and/or the demands of the HVAC system 100, the diverter valve 206 may be configured to selectively divert the hot exhaust fluid received from the exhaust 170 of the generator 152 at least partially through the exhaust vent tube 204 and/or the exhaust delivery tube 208.

Generally, when the HVAC system 100 is in a heating mode, the exhaust heat recovery system 200 may be operated in a heat recovery mode, such that the diverter valve 206 may divert at least a portion of the hot exhaust fluid through the exhaust delivery tube 208. It will be appreciated that in some embodiments, the exhaust heat recovery system 200 may be operated in a venting mode in which substantially none of the hot exhaust fluid is diverted through the exhaust delivery tube 208. Operating the exhaust heat recovery system 200 in a venting mode during an HVAC system 100 heating mode may be employed when substantially no heat from the exhaust 170 may be required by the HVAC system 100 to deter and/or delay the formation of frost on the outdoor heat exchanger 114. In alternative embodiments, however, the exhaust heat recovery system 200 may always be configured in a so-called defrost mode, so that the hot exhaust fluid from the exhaust 170 of the generator 152 is continuously discharged onto the outdoor heat exchanger 114 to maintain a defrosted coil and/or deter the formation of frost on the outdoor heat exchanger 114 during a demand for heat by the HVAC system 100. When the diverter valve 206 at least partially diverts hot exhaust fluid to the exhaust delivery tube 208, the exhaust delivery tube 208 may be configured to direct the hot exhaust fluid onto the outdoor heat exchanger 114 as shown by exhaust airflow 202. In some embodiments, the hot exhaust fluid may generally mix with outdoor air entering the outside heat exchanger 114. Both the hot exhaust fluid and the outdoor air may be passed over the outdoor heat exchanger 114 by the outdoor fan 118. Accordingly, discharging the hot exhaust fluid onto the outdoor heat exchanger 114 may cause the heat contained in the hot exhaust fluid to evaporate any liquid condensation that may be condensed on the outside heat exchanger 114. Generally, when the exhaust heat recovery system 200 is operated to recover heat from the exhaust 170 of the generator 152 to deter the formation of frozen condensate on the outdoor heat exchanger 114, this may be referred to as a heat recovery mode of operation and/or an exhaust defrost mode or operation.

The exhaust heat recovery system 200 may generally be configured in the defrost mode through the operation of the diverter valve 206 in response to the configuration and/or demands of the HVAC system 100. In some embodiments, the diverter valve 206 may be an electronically-controlled diverter valve and/or any other suitable electronically-controlled damper. In some embodiments, the diverter valve 206 may be configured to at least partially open in response to a selection of the defrost mode made by a user via a controller 106, 124, 126. In some embodiments, however, the defrost mode may be employed based on a preprogrammed schedule in a controller 106, 124, 126. For example, the defrost mode may be employed every 3 hours. In some embodiments, the defrost mode may be configured to be controlled in response to a measured refrigerant temperature and/or a difference between a measured refrigerant temperature and a refrigerant temperature set threshold. In some embodiments, the defrost mode may be controlled in response to a measured refrigerant temperature entering the outdoor heat exchanger 114 and/or entering the indoor heat exchanger 108. In yet other embodiments, the defrost mode may be controlled in response to an outdoor ambient temperature and/or a temperature of the outdoor heat exchanger 114.

Furthermore, and in some embodiments, the exhaust heat recovery system 200 may be operated in a defrost mode and used in conjunction with a defrost mode of operation of the HVAC system 100. In other words, heat discharged by the generator 152 may be recovered simultaneously through the generator fluid circuit 150 and the exhaust 170 of the generator 152 and used to defrost the outdoor heat exchanger 114 substantially as disclosed herein. When both the exhaust heat recovery system 200 and the HVAC system 100 are configured in their respective defrost modes, however, the outdoor fan 118 may continue to operate in order to draw the hot exhaust fluid through the outdoor heat exchanger 114. Accordingly, in some embodiments, the recovery of heat through both the exhaust 170 and generator fluid circuit 150 may provide a greater amount of overall heat recovery, which may result in a more efficient and/or quicker defrosting of the outdoor heat exchanger 114. Generally, the exhaust heat recovery system 200 and the HVAC system 100 may be configured in defrost mode by a controller 106, 124, 126. In some embodiments, each system 100, 200 may be configured in a defrost mode separately. In some embodiments, one system 100, 200 may be configured in the defrost mode, wherein the second system 100, 200 is employed in the defrost mode in response to a preconfigured amount of time, an excessively low outdoor temperature, and/or a refrigerant temperature.

It will be appreciated that operating the HVAC system 100 and/or the exhaust heat recovery system 200 in a defrost mode to recover heat energy through the generator fluid circuit 150 and/or the exhaust 170 may generally eliminate the need to reverse the refrigerant flow direction to defrost the outdoor heat exchanger 114. As stated, reversing the refrigerant flow direction to defrost the outdoor heat exchanger 114 may cause damage, stress, and excessive wear on the components of the heat pump system. Thus, recovering heat from the generator 152 through the generator fluid circuit 150 to defrost the outdoor heat exchanger 114 and/or through the exhaust 170 to deter the formation of frost on the outdoor heat exchanger 114 may extend the life and/or reliability of HVAC system 100 components. Additionally, recovering heat from the generator 152 may also reduce and/or eliminate the need to operate backup heat sources, such as electrical resistance heaters, to provide heat to an indoor climate-controlled area, since the indoor heat exchanger 108 may continue to provide heat to an indoor climate-controlled area when operated in the defrost mode, as opposed to the indoor heat exchanger 108 providing cooling. Thus, the outdoor heat exchanger 114 may generally be defrosted while continuously providing heat to an indoor climate-controlled area.

Figure 3:
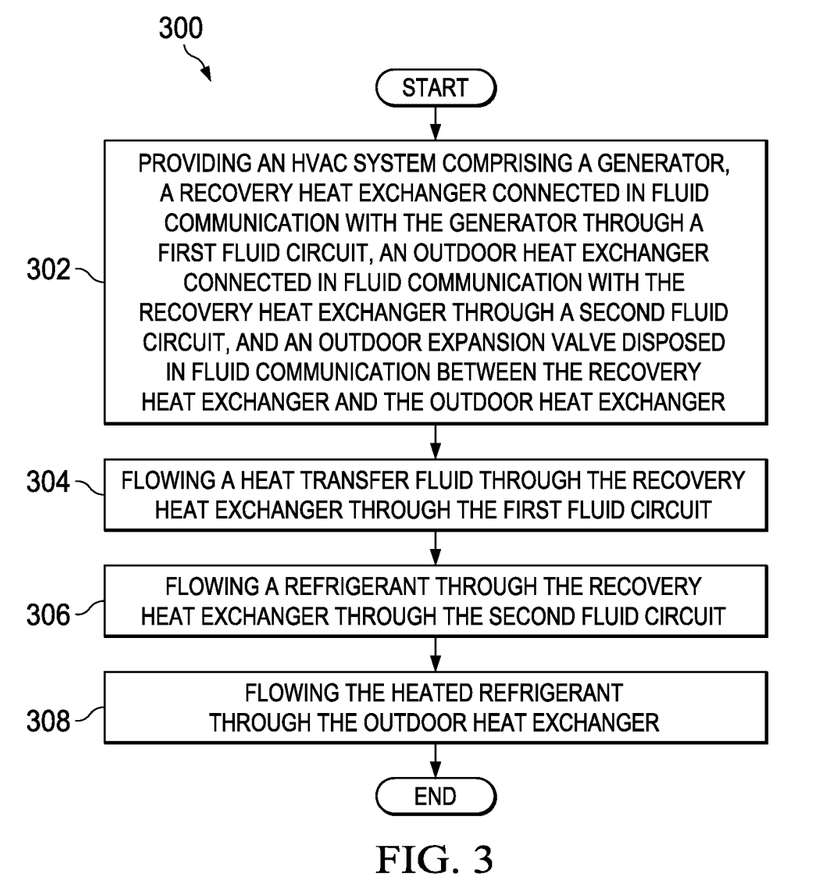
FIG. 3 is a flowchart of a method of defrosting an outdoor heat exchanger of an HVAC system according to an embodiment of the disclosure.

Referring now to FIG. 3, a flowchart of a method 300 of defrosting an outdoor heat exchanger 114 of an HVAC system 100 is shown according to an embodiment of the disclosure. The method 300 may begin at block 302 by providing an HVAC system comprising a generator, a recovery heat exchanger connected in fluid communication with the generator through a first fluid circuit, an outdoor heat exchanger connected in fluid communication with the recovery heat exchanger through a second fluid circuit, and an outdoor expansion valve disposed in fluid communication between the recovery heat exchanger and the outdoor heat exchanger. In some embodiments, the HVAC system may comprise an outdoor fan configured to control airflow through the outdoor heat exchanger. The method 300 may continue at block 304 by flowing a heat transfer fluid through the recovery heat exchanger through the first fluid circuit. The method 300 may continue at block 306 by flowing a refrigerant through the recovery heat exchanger through the second fluid circuit. In some embodiments, the recovery heat exchanger may be configured to promote heat transfer between the heat transfer fluid and the refrigerant and configured to deliver heated refrigerant to the outdoor heat exchanger. The method 300 may conclude at block 308 by flowing the heated refrigerant through the outdoor heat exchanger. In some embodiments, passing the heated refrigerant through the outdoor heat exchanger may melt frozen condensate accumulated on the outdoor heat exchanger. In some embodiments, the outdoor expansion valve may be configured to provide substantially no restriction to the refrigerant flowing between the recovery heat exchanger and the outdoor heat exchanger. In some embodiments, the outdoor fan may be configured to provide substantially no airflow through the outdoor heat exchanger.

Figure 4:
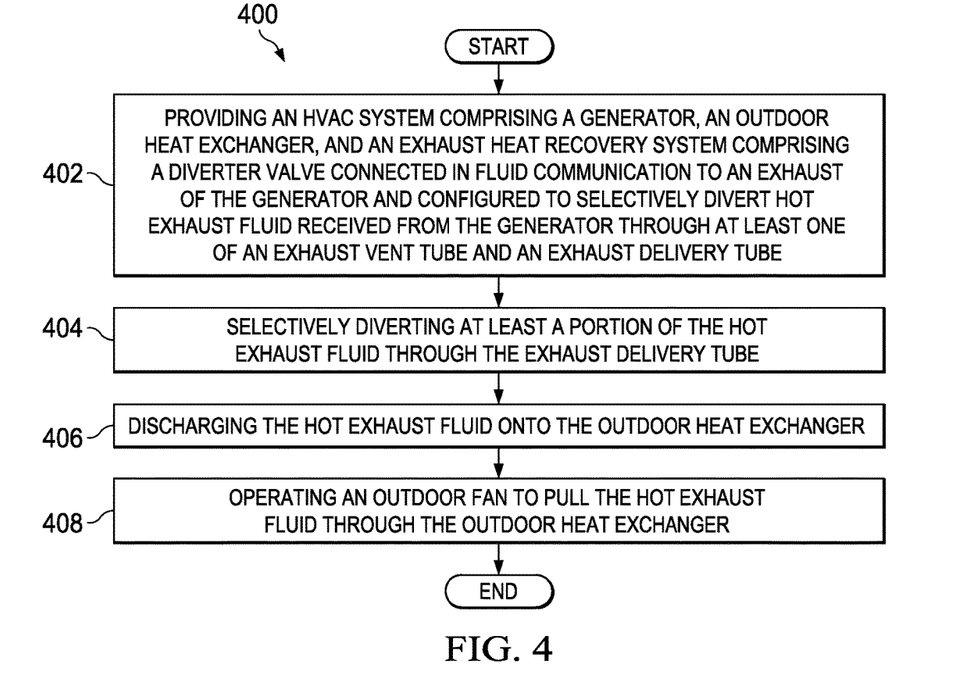
FIG. 4 is a flowchart of a method of deterring the formation of frozen condensate on an outdoor heat exchanger of an HVAC system comprising an exhaust heat recovery system according to an embodiment of the disclosure.

Referring now to FIG. 4, a flowchart of a method 400 of deterring the formation of frozen condensation on an outdoor heat exchanger 114 of an HVAC system 100 comprising an exhaust heat recovery system is shown according to an embodiment of the disclosure. The method 400 may begin at block 402 by providing an HVAC system comprising a generator, an outdoor heat exchanger, and an exhaust heat recovery system comprising a diverter valve connected in fluid communication to an exhaust of the generator and configured to selectively divert hot exhaust fluid received from the generator through at least one of an exhaust vent tube and an exhaust delivery tube. The method 400 may continue at block 404 by selectively diverting at least a portion of the hot exhaust fluid through the exhaust delivery tube. The method 400 may continue at block 406 by discharging the hot exhaust fluid onto the outdoor heat exchanger. The method 400 may conclude at block 408 by operating an outdoor fan to pass the hot exhaust fluid through the outdoor heat exchanger. In some embodiments, the exhaust heat recovery system may comprise an auxiliary heat exchanger connected in fluid communication with the outdoor heat exchanger and configured to (1) receive the hot exhaust fluid from the exhaust delivery tube and (2) deliver refrigerant to the outdoor heat exchanger. In some embodiments, the auxiliary heat exchanger may be configured to promote heat transfer between the hot exhaust fluid and the refrigerant and configured to deliver heated refrigerant to the outdoor heat exchanger to melt frozen condensate accumulated on the outdoor heat exchanger.

Figure 5:
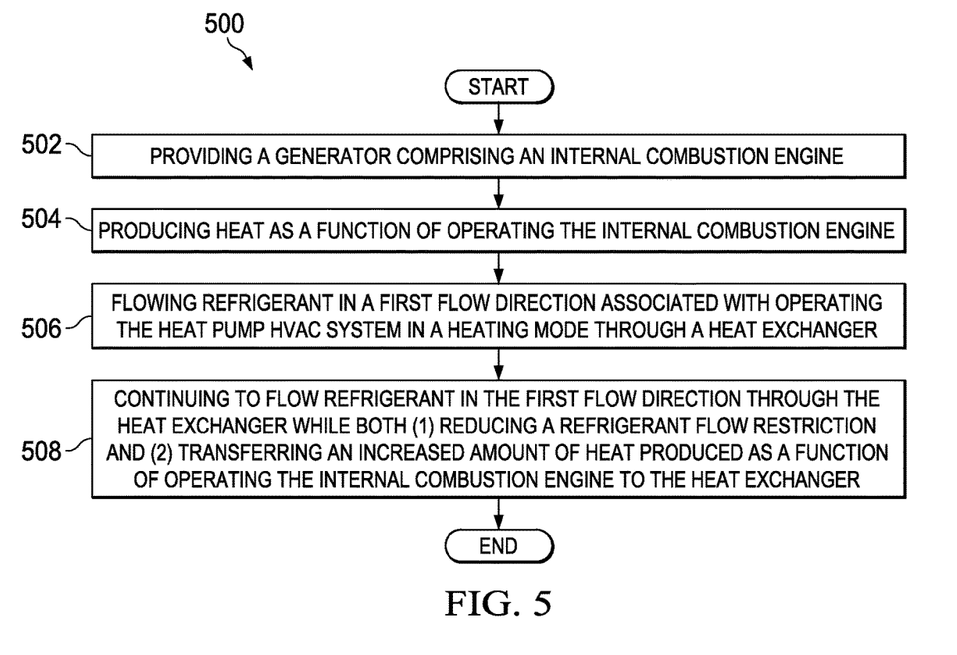
FIG. 5 is a flowchart of a method of operating an HVAC system according to an embodiment of the disclosure.

Referring now to FIG. 5, a flowchart of a method 500 of operating a heat pump heating, ventilation, and/or air conditioning (HVAC) system 100 is shown according to an embodiment of the disclosure. The method 500 may begin at block 502 by providing a generator comprising an internal combustion engine. The method 500 may continue at block 504 by producing heat as a function of operating the internal combustion engine. The method 500 may continue at block 506 by flowing refrigerant in a first flow direction associated with operating the heat pump HVAC system in a heating mode through a heat exchanger. The method 500 may conclude at block 508 by continuing to flow refrigerant in the first flow direction through the heat exchanger while both (1) reducing a refrigerant flow restriction and (2) transferring an increased amount of heat produced as a function of operating the internal combustion engine to the heat exchanger.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_1$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A defrost mode for a heat pump heating, ventilation, and/or air conditioning (HVAC) system, comprising:
    a refrigerant circuit comprising a heat exchanger, wherein the heat exchanger is configured to receive a refrigerant in a first flow direction in the refrigerant circuit while operating the HVAC system in a heating mode;
    a generator coupled to the refrigerant circuit through a generator fluid circuit, wherein the generator is configured to produce heat as a function of operating the generator;
    a recovery heat exchanger coupled to the generator and the heat exchanger and configured to receive at least a portion of the heat from the generator through the generator fluid circuit;
    an exhaust vent in fluid communication with an exhaust of the generator and configured to receive heated exhaust air from the generator,
    a controller coupled to each of the generator and the HVAC, wherein the controller is configured to:
        operate the HVAC system in the defrost mode, wherein the defrost mode comprises operating the HVAC system in the heating mode;
        selectively divert the heated exhaust air from the generator to the heat exchanger;
        provide at least the portion of the heat from the generator to the recovery heat exchanger through the generator fluid circuit while reducing a restriction of flow of the refrigerant provided by a refrigerant restriction device to the heat exchanger; and
        reduce an airflow across the heat exchanger to increase a rate of heat transfer from the refrigerant to a frozen condensate in contact with the heat exchanger while continually providing heat to an indoor area conditioned by the HVAC system.

2. The HVAC system of claim 1, wherein the recovery heat exchanger is configured to receive the refrigerant therethrough in the first flow direction.

3. The HVAC system of claim 1, wherein the recovery heat exchanger is configured to promote heat transfer between a heat transfer fluid flowing through the generator fluid circuit and the refrigerant flowing through the refrigerant circuit.

4. The HVAC system of claim 1, wherein the recovery heat exchanger is configured to increase a temperature of the refrigerant delivered to the heat exchanger.

5. The HVAC system of claim 1, wherein the refrigerant restriction device is disposed in fluid communication between the recovery heat exchanger and the heat exchanger.

6. The HVAC system of claim 1, wherein the controller is configured to reduce a speed of a fan configured to provide an airflow through the heat exchanger.

7. The HVAC system of claim 1, further comprising a diverter configured to selectively divert exhaust fluid produced as a function of operating the generator into contact with the heat exchanger.

8. The HVAC system of claim 1, wherein the controller initiates the defrost mode in response to a preprogrammed schedule in the controller.

9. The HVAC system of claim 1, wherein the controller initiates the defrost mode in response to a difference between a measured refrigerant temperature and a refrigerant temperature threshold.

10. The HVAC system of claim 1, wherein the controller initiates the defrost mode in response to a condition indicative of excessive frost on the heat exchanger.

11. A method of operating a heat pump heating, ventilation, and/or air conditioning (HVAC) system in a defrost mode, comprising:
providing a refrigerant circuit comprising a heat exchanger, wherein the heat exchanger is configured to receive a refrigerant in a first flow direction in the refrigerant circuit while operating the HVAC system in a heating mode;
coupling a generator to the refrigerant circuit through a generator fluid circuit;
providing an exhaust vent in fluid communication with an exhaust of the generator and configured to receive heated exhaust air from the generator;
producing heat as a function of operating the generator;
operating the HVAC system in the heating mode by flowing a refrigerant in a first flow direction through a heat exchanger; and
operating the HVAC system in the defrost mode, wherein the defrost mode comprises:
operating the HVAC system in the heating mode;
selectively diverting the heated exhaust air from the generator to the heat exchanger; and
providing at least the portion of the heat from the generator to a recovery heat exchanger while reducing a restriction of flow of the refrigerant provided by a refrigerant restriction device to the heat exchanger; and
reducing an airflow across the heat exchanger to increase a rate of heat transfer from the refrigerant to a frozen condensate in contact with the heat exchanger while continually providing heat to an indoor area conditioned by the HVAC system.

12. The method of claim 11, further comprising providing the recovery heat exchanger connected in fluid communication with the heat exchanger through the refrigerant circuit and connected in fluid communication with the generator through the generator fluid circuit.

13. The method of claim 12, further comprising receiving the refrigerant through the refrigerant circuit in the first flow direction.

14. The method of claim 13, further comprising receiving a heat transfer fluid from the generator through the generator fluid circuit.

15. The method of claim 14, wherein the recovery heat exchanger is configured to promote heat transfer between the heat transfer fluid flowing through the generator fluid circuit and the refrigerant flowing through the refrigerant circuit.

16. The method of claim 11, wherein the recovery heat exchanger is configured to increase a temperature of the refrigerant delivered to the heat exchanger.

17. The method of claim 11, wherein reducing the restriction of flow of the refrigerant is accomplished through a refrigerant restriction device that is disposed in fluid communication between the recovery heat exchanger and the heat exchanger.

18. The method of claim 11, further comprising controlling an outdoor fan to reduce an airflow through the heat exchanger.

19. The method of claim 18, further comprising selectively operating the outdoor fan to pass at least a portion of the heated exhaust air over the heat exchanger.

* * * * *